United States Patent [19]
Mitchell

[11] 3,877,900
[45] Apr. 15, 1975

[54] DUST COLLECTOR
[75] Inventor: Wallace F. Mitchell, Libertyville, Ill.
[73] Assignee: Ammco Tools, Inc., North Chicago, Ill.
[22] Filed: Dec. 10, 1973
[21] Appl. No.: 423,413

[52] U.S. Cl. .................. 55/366; 55/374; 55/385; 55/429; 55/503; 55/507
[51] Int. Cl. ............................................. B01d 46/02
[58] Field of Search ........ 55/366, 377, 429, DIG. 2, 55/DIG. 3, 364, 374, 428, 467, 471–473, 502, 503, 505, 507, 310, 311, 385; 229/62

[56] References Cited
UNITED STATES PATENTS

| | | | |
|---|---|---|---|
| 957,130 | 5/1910 | Wear | 55/473 X |
| 1,078,651 | 11/1913 | Winans | 55/311 |
| 1,786,756 | 12/1930 | Juelson | 55/472 X |
| 2,222,077 | 11/1940 | Kahn | 55/366 |
| 2,594,281 | 4/1952 | Berg | 55/374 |
| 2,943,698 | 7/1960 | Bishop | 55/DIG. 3 |
| 3,088,260 | 7/1963 | Seyfried | 55/374 |
| 3,208,202 | 9/1965 | Herubel | 55/429 X |
| 3,320,725 | 5/1967 | Foster | 55/366 X |
| 3,343,344 | 9/1967 | Fairaizl et al. | 55/429 X |
| 3,480,198 | 11/1969 | Repko | 229/62 X |
| 3,621,641 | 11/1971 | Takei et al. | 55/366 X |
| 3,653,190 | 4/1972 | Lee et al. | 55/DIG. 3 |
| 3,664,575 | 5/1972 | Lake | 229/62 |
| 3,716,182 | 2/1973 | Korn | 229/62 |
| 3,774,838 | 11/1973 | Christie | 229/62 |

FOREIGN PATENTS OR APPLICATIONS

| | | | |
|---|---|---|---|
| 879,781 | 10/1961 | United Kingdom | 55/DIG. 2 |
| 934,293 | 8/1963 | United Kingdom | 55/DIG. 3 |
| 1,359,227 | 3/1963 | France | 55/459 |

*Primary Examiner*—Frank W. Lutter
*Assistant Examiner*—Kathleen J. Prunner
*Attorney, Agent, or Firm*—Edmond T. Patnaude

[57] ABSTRACT

A dust collector into which dust laden air is blown under pressure includes an air pervious dust bag sealably mounted over an impervious, disposable bag into which the dust from the bag falls by gravity each time the blower is stopped. The bag is contained in a perforated, bucket-like housing scalably connected over the open bottom of the dust bag.

1 Claim, 4 Drawing Figures

PATENTED APR 15 1975     3,877,900

DUST COLLECTOR

The present invention generally relates to apparatus for separating dust particles from air, and it relates to a new and improved dust collector including a sealable, disposable bag in which the dust is collected and discarded. This invention is an improvement of the dust collector disclosed in my copending application Ser. No. 340,324, filed Mar. 12, 1973 and assigned to the same assignee as is the present invention.

BACKGROUND OF THE INVENTION

Dust generated by grinders and other material removal machinery is a potential hazard to the machinery operators and other persons in the same general location. In the past this dust has been collected with vacuum cleaners which pull or suck the dust laden air from the immediate area in which it is produced and force it into the ambient atmosphere through an air pervious filter bag which functions both as a filter and as a dust collector. A serious problem with this prior art type of dust collector is that when the bad becomes filled with dust and/or the pores thereof become clogged with the dust particles, there is insufficient suction to remove the dust being produced and the motor of the dust collector becomes overloaded. Moreover, the dust particles are blown into the atmosphere. In fact, because of the inherent danger to the persons using this type of equipment, there are many localities which have banned the use of brake shoe grinding machinery which incorporates that prior art type of dust collector.

Another problem associated with the prior art type of dust collector is that of disposing of the collected dust particles without permitting at least some of the dust to escape into the atmosphere. A partial answer to the problem has been the use of disposable liner bags removably mounted within the main bag. However, this has not proven to entirely eliminate the problem.

OBJECTS OF THE INVENTION

Therefore, a principal object of the present invention is to provide a new and improved dust collector.

Another object of the present invention is to provide a dust collector employing a disposable plastic bag in which the dust particles are collected, which bag may be quickly and easily sealed and removed from the collector for discarding and replacement.

Still another object of this invention is to provide a dust collector adapted for use with brake shoe grinders and which meets the Federal Clean Air Standards.

A further object of this invention is to provide a new and improved disposable bag having integral ties for tying off the bag.

SUMMARY OF THE INVENTION

Briefly, the above and further objects may be realized in accordance with the present invention by providing a dust bag having a large open mouth at the bottom and connectable at the top to the outlet of a blower positioned to pull the dust laden air from the immediate area in which it is produced and blow it under pressure into the bag, and an air impervious plastic bag sealed over the open bottom of the dust bag. With the blower operating, the dust particles are collected on the inner surface of the dust bag and each time the blower is stopped the dust bag partially collapses and the dust particles deposited therein fall into the plastic bag. Periodically, and before the plastic bag is full, the connection between the two bags is opened, the plastic bag is sealably tied off by integral ties thereon, and a fresh bag is sealably connected to the bottom of the dust bag. It will be apparent that operation of the blower in the absence of the disposable bag will spew dust directly onto the floor whereupon the operator will promptly shut down the system and attach a plastic collector bag thereto.

BRIEF DESCRIPTION OF THE DRAWINGS

Further objects and advantages and a better understanding of the present invention can be had by reference to the following detailed description, wherein.

DETAILED DESCRIPTION OF THE INVENTION

Figure 1:
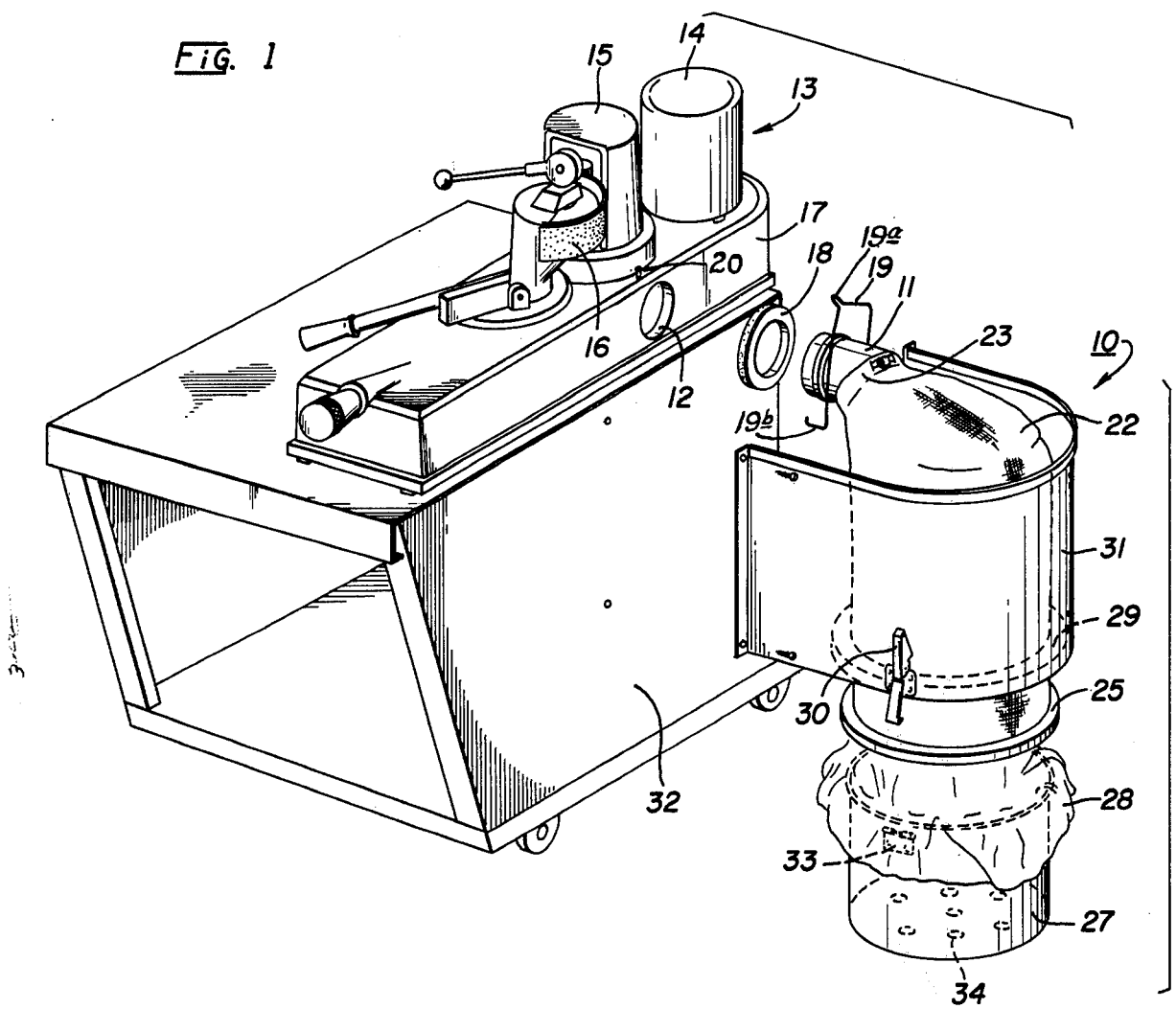
FIG. 1 is an exploded perspective view of a dust collector embodying the present invention in combination with a brake shoe grinder.

Referring to the drawing, a dust collector 10 includes an inlet duct 11 which is sealably connected to the exhaust part 12 of a brake shoe grinder 13. The grinder 13 is of the type described in U.S. Pat. No. 3,234,693 and includes an electric motor 14 which drives a grinding wheel (not visible in the drawing) located in a hood 15 for resurfacing the arcuate abrasive surface 16 of the brake shoe clamped in the grinder. An impeller (not shown) is located within the hollow base 17 of the grinder to draw air and any particles entrained therein through the hood 15 and into the hollow base from which the air exits under pressure through the exhaust outlet 12. A resilient sealing ring 18 is disposed between the exhaust port 12 and the duct 11, and a spring clip 19 holds the duct 11 firmly within the port 12 in sealing engagement therewith. More particularly, the U-shaped upper portion 19a of the clip fits over a headed stud 20 and the lower ends 19b snap under the base of the grinder 13.

A generally cylindrical, cloth dust bag 22 has an inlet sleeve 23 which fits over the depending end of the dust 11. The lower end of the dust bag 22 is open and is fixedly and sealably connected at its periphery to a resilient sealing ring 25 which provides an external annular flange at the bottom end of the bag.

A cylindrical pail or bucket 27 has an internal diameter intermediate the internal and external diameters of the ring 25. In use, a flexible plastic bag 28 is placed in the pail 27 with the upper sides of the bag overhanging the rim of the pail as shown in FIG. 1. The pail is then lifted to sealably engage the ring 25 which is held in a downwardly opening annular groove in a ring 29, and the pail then is held in the sealed elevated position by a pair of toggle latch members 30. The latch members 30 and the ring 29 are carried by a U-shaped, rigid guard member 31 which is mounted to a bench 32 on which the grinder 13 is mounted. The ring 29 and the latch members 30 are secured by suitable means to the guard member. The latch members 30 lockingly engage a corresponding pair of clips 33 riveted to the sides of the pail 27 whereby the collector bag 28 is sealed over the bottom end of the dust bag 22. A plurality of openings 34 are provided in the bottom of the pail 27 to relieve the pressure between the bag 28 and the pail and to permit dust to exit the system if a bag is not located in the collector.

Figure 2:
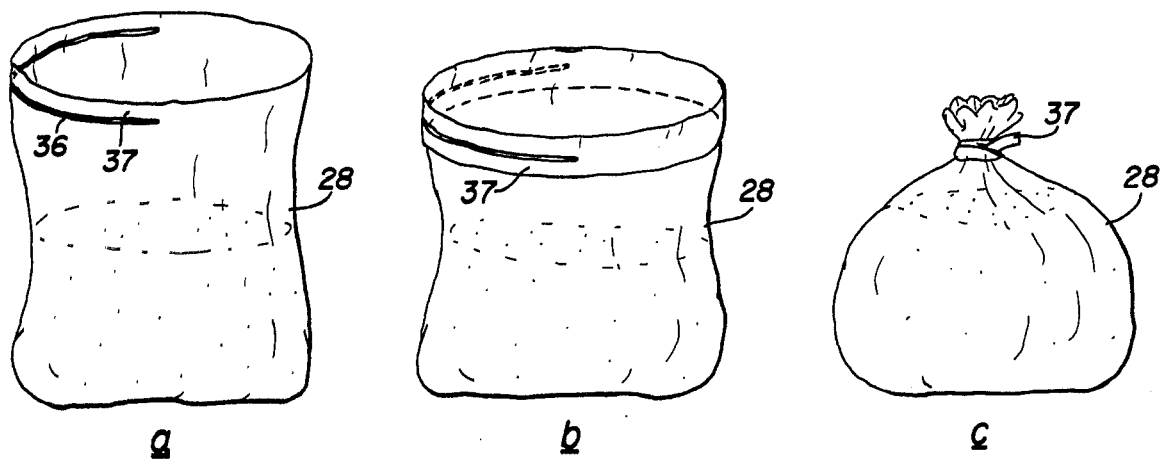
FIGS. 2a, 2b and 2c show the steps followed when sealing off the dust collector bag of the present invention.

Referring now to FIG. 2, the bag 28 is slit circumferentially at 36 through about 180° near the top to provide an integral, elongated strip portion 37 which may be cut in two and used for trying off and sealing the dust filled bag. In use, the upper portion of the bag 28 is folded outwardly and downwardly a few inches to the position shown in FIG. 2b. The upper portion of the bag is then carefully gathered together to assure against the dust from the bag being released into the atmosphere, and the strip 37 is cut or torn into two sections which are tightly wrapped once or twice around the gathered portion of the bag and tied together as shown in FIG. 2c. The sealed bag can then be safely discarded.

The dust collector of the present invention thus provides a system which provides excellent dust removal characteristics, is easy to use, and is readily adaptable to existing machines. The guard 31 prevents accidental touching of the fabric bag 22 which could result in the escape of dust through the bag, and the pail 27 prevents accidental damage to the bag 28. Moreover, the pail 20 simplifies handling of the dust filled bag 28 during the bag replacement operation. The integral tie strips on the bag 28 are not only a convenience but assure that the bags will be tied before being discarded.

While the present invention has been described in connection with particular embodiments thereof, it will be understood by those skilled in the art that many changes and modifications may be made without departing from the true spirit and scope of the present invention. For example, the illustrated device is for use with brake shoe grinders but the principles of the invention have other uses as, for example, with other types of grinders. Therefore, it is intended by the appended claims to cover all such changes and modifications which come within the true spirit and scope of this invention.

What I claim is:

1. A dust collector for use with a grinding machine having an exhaust port through which dust laden air is emitted under pressure, the combination comprising, an air pervious dust bag having an inlet sleeve near the top and an open bottom, means for sealably connecting said sleeve to said exhaust port, a resilient sealing ring fixedly connected to said bag and providing an external flange at the bottom end of said bag.

a rigid guard member adapted to be mounted in fixed relationship with said grinding machine and surrounding said dust bag, a ring having a downwardly opening annular groove carried by said guard member near the bottom thereof, said resilient sealing ring being held in said annular groove an open top perforate container, an imperforate flexible bag disposed in said container with the rim portion of said bag overhanging the rim of said container, and latch means securing said container to said guard with an annular portion of said bag compressed between the rim of said container and said resilient ring.

\* \* \* \* \*